United States Patent [19]
Ferron

[11] Patent Number: 5,080,475
[45] Date of Patent: Jan. 14, 1992

[54] AUXILIARY LENS FRAME FOR EYEGLASSES

[76] Inventor: Robert W. Ferron, 7122 Jefferson, Kansas City, Mo. 64114

[21] Appl. No.: 570,919

[22] Filed: Aug. 22, 1990

[51] Int. Cl.$^5$ ............ G02C 7/08; G02C 9/00
[52] U.S. Cl. .................................. 351/57; 351/47
[58] Field of Search ............ 351/47, 48, 57, 58, 351/52

[56] References Cited

U.S. PATENT DOCUMENTS

| | | |
|---|---|---|
| 1,348,713 | 8/1920 | Gitterman . |
| 2,413,193 | 12/1946 | Robblee . |
| 3,536,385 | 10/1970 | Johnston . |
| 3,890,037 | 6/1975 | Zingarelli . |
| 3,958,867 | 5/1976 | Morgan . |
| 3,981,569 | 9/1976 | Morgan . |
| 4,070,103 | 1/1978 | Meeker . |
| 4,217,037 | 8/1980 | Lemelson . |
| 4,534,627 | 8/1985 | Vosper . |
| 4,822,158 | 4/1989 | Porsche . |

FOREIGN PATENT DOCUMENTS

| | | | |
|---|---|---|---|
| 675812 | 5/1929 | France | 351/58 |
| 79176 | 4/1955 | Netherlands | 351/57 |

Primary Examiner—Rodney B. Bovernick
Attorney, Agent, or Firm—Litman, McMahon & Brown

[57] ABSTRACT

An auxiliary lens support structure for eyeglasses includes a pair of auxiliary lenses and an auxiliary frame for holding the lenses. The auxiliary frame matches a primary frame in shape and size and includes a primary frame receiving groove comprised of a pliant projecting flange and flange edge. The primary frame receiving groove extends over substantially the entire periphery of the primary frame for firm and secure retention. Also, the auxiliary lenses are non-circular and fashioned to match a pair of primary lenses mounted in the primary frame.

2 Claims, 2 Drawing Sheets

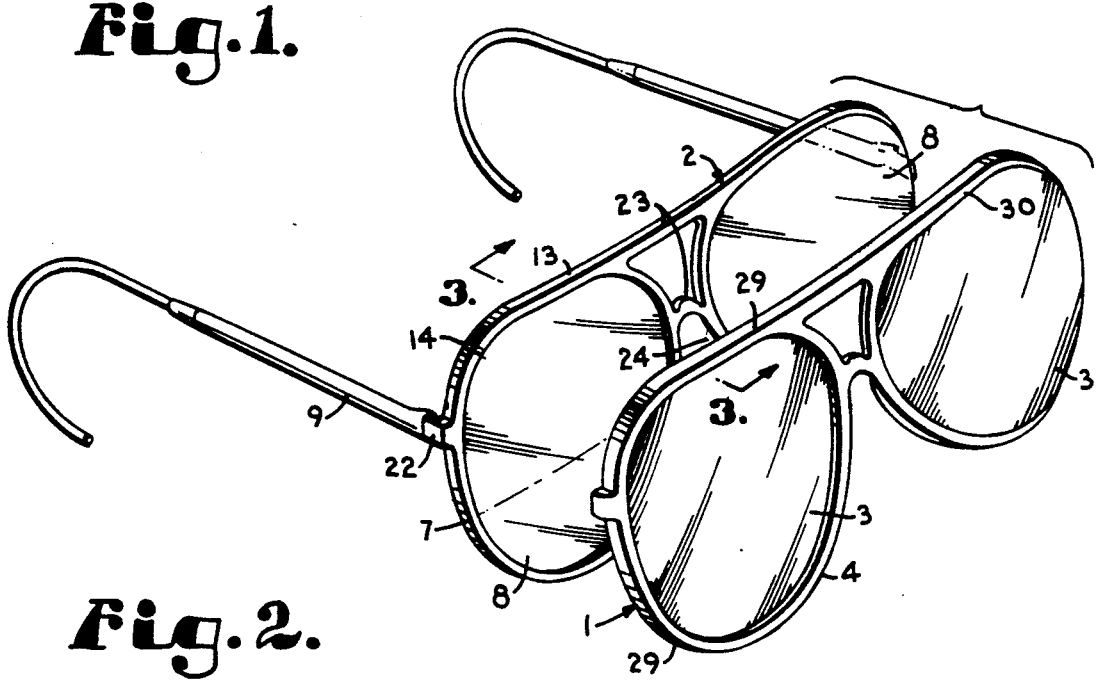
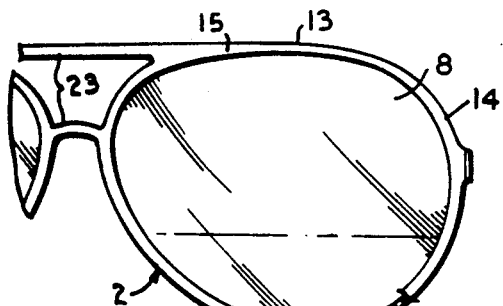
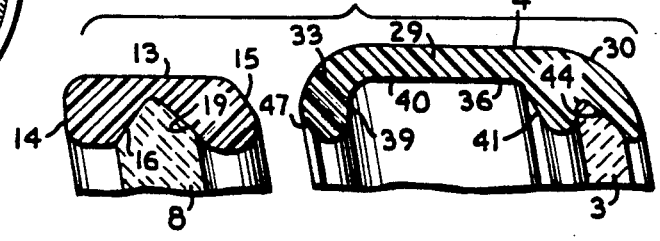
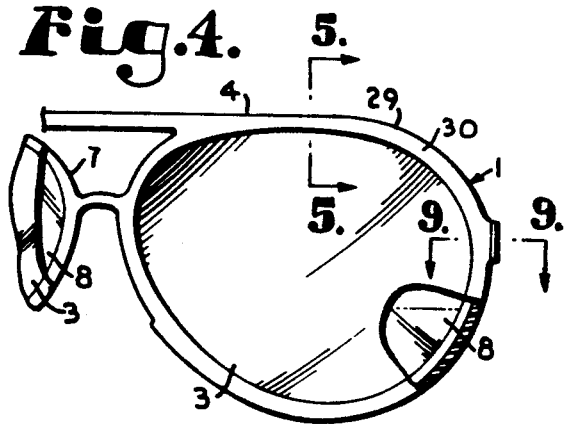
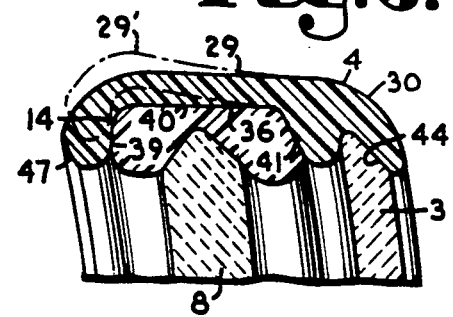

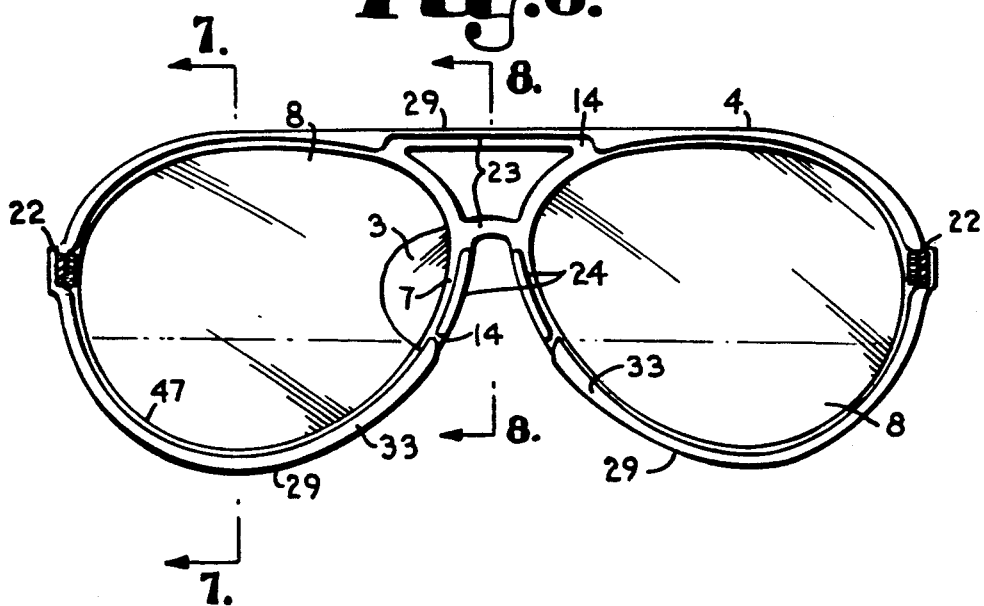
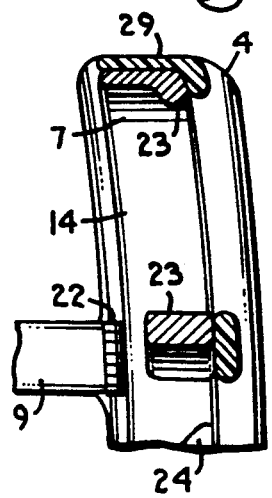
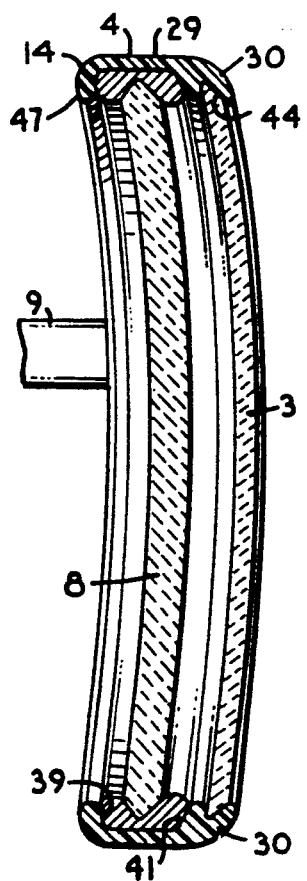
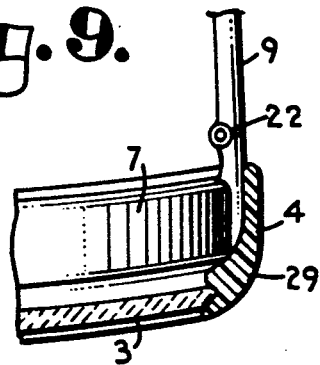

_5,080,475_

AUXILIARY LENS FRAME FOR EYEGLASSES

BACKGROUND OF THE INVENTION

The present invention relates to an auxiliary lens support structure and, in particular, to an auxiliary lens support structure removably attachable in a firm and secure manner to a primary pair of prescription eyeglasses.

For those who enjoy outdoor activities, protection is often needed from the harmful effects and discomfort associated with bright sunlight and glare. People wearing prescription eyeglasses, however, are disadvantaged in obtaining such protection. Two major alternatives exist presently. First, prescription sunglasses are available but this option is often quite expensive and inconvenient. Second, several auxiliary lens attachments are available for use with a primary pair of prescription eyeglasses. These attachments, however, are often ill-suited for use by active people.

The most common type of auxiliary lens attachment utilizes clips or hooks to attach it to the primary frame. This clip-on type of sunglasses has many disadvantages. For example, most people consider them to be unattractive and unfashionable. Additionally, they attach directly onto small areas of the primary frame or on prescription lenses themselves. Such an arrangement can scratch the lenses and/or cause damage to the finish of the primary frame. Also, the clips can impede the wearer's line-of-sight.

However, for active persons the major disadvantage with present auxiliary lens attachments is that they do not provide a firm and secure fit with the primary eyeglasses. The mounting arrangements currently available do not provide a firm retention necessary for persons engaged in rapid movement sports such as jogging, bicycling, and the like.

SUMMARY OF THE INVENTION

The present invention provides an auxiliary lens support structure which can be firmly attached to a primary pair of eyeglasses for any suitable purpose, such as protection against bright sunlight, modifying the correction of the underlying lenses, ultra violet blockage, polarization, extra coverage against small flying objects, etc. The auxiliary structure includes a unique frame which holds two transparent lenses and includes means for providing convenient but highly secure attachment to the primary frame. The auxiliary frame is securable onto the primary frame through the use of a pliant, projecting flange which is shaped to extend in close compliance over almost the entire periphery of the primary frame. The projecting flange is shaped to form an inwardly open channel or groove into which the periphery of the primary frame is seated upon the flange being biased over and onto the periphery of the primary frame. The resulting engaging relationship provides an extremely secure association between the primary and auxiliary frame while permitting highly variable design variations for aesthetic purposes.

OBJECTS OF THE INVENTION

The principal objects of the present invention are: to provide an auxiliary lens support structure which can be easily and yet firmly and securely attached to a primary pair of eyeglasses; to provide such a structure which engages the primary eyeglasses over substantially the entire periphery thereof; to provide such a structure which is as aesthetically pleasing as the primary eyeglasses and does not detract therefrom; to provide such a structure which does not significantly obstruct the line-of-sight of the wearer over primary eyeglasses; to provide such a structure which can be utilized with a great variety of different types and shapes of primary frames; and to provide such a structure which is relatively inexpensive to manufacture and particularly well adapted for the intended use thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is an exploded perspective view of an auxiliary frame and lens structure shown aligned with an associated pair of primary eyeglasses having a primary frame and lenses, in accordance with a preferred embodiment of the present invention.

FIG. 2 is a fragmentary front elevational view of the primary eyeglasses with a portion broken away to show the positional relationship of a lens to the primary frame.

FIG. 3 is an enlarged and fragmentary cross-sectional view through the aligned primary and auxiliary frames, taken along the line 3—3, FIG. 1.

FIG. 4 is a fragmentary front elevational view of the auxiliary frame and lens structure shown secured to the primary eyeglasses, with portions broken away to show the relative positioning thereof.

FIG. 5 is an enlarged and fragmentary cross-sectional view through the secured primary and auxiliary frames, taken along the line 5—5, FIG. 4.

FIG. 6 is a rear elevational view of the secured primary and auxiliary frames with portions broken away to show the non-interfering nature of the auxiliary frame.

FIG. 7 is an enlarged and fragmentary cross-sectional view taken along the line 7—7 of FIG. 6.

FIG. 8 is an enlarged and fragmentary cross-sectional view taken along the line 8—8 of FIG. 6.

FIG. 9 is an enlarged and fragmentary cross-sectional view, taken along the line 9—9 of FIG. 4.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally represents an auxiliary lens support structure removably attachable to a primary pair of eyeglasses 2 such as common prescription eyeglasses. The support structure 1 firmly retains a pair of auxiliary lenses 3 in an auxiliary frame 4. The auxiliary structure 1 further includes means described below, for attaching the auxiliary frame 4 to the primary eyeglasses 2.

The primary eyeglasses 2 includes, in this example, a frame 7, non-circular lenses 8, and temples 9.

The primary frame 7, as shown in FIG. 3, exhibits a peripheral or outer surface 13, a rear edge 14, a slanted front edge 15, and an inner surface 16. The inner surface 16 forms a primary lens receiving groove 19 in which the lenses 8 are seated in a secure manner. Also, in accordance with a common eyeglass configuration, the primary frame 7 has temple hinge mounts 22 onto which the temples 9 are hingedly anchored, a primary bridge structure 23 spanning the lens holding portions, and nose pads 24.

The auxiliary frame 4 has a fixed overall configuration substantially similar to the shape and size of the primary frame 7, as best shown in FIG. 1. The auxiliary frame 4 is shaped to form a flange 29 extending rearwardly from a lens securing portion 30. The flange 29 is constructed of an appropriately flexible material whereby it is biasable radially outwardly as shown by the broken lines 29', FIG. 5, and substantially surrounds the space behind the auxiliary lens 3, except in the nose receiving area. The flange 29 terminates rearwardly in a lip 33 which projects inwardly, forming with the securing portion 30 a primary frame receiving groove 36 extending along the inner surface of the flange 29. The primary frame receiving groove 36 is defined by a rear surface 39, corresponding to the inner surface of the flange edge 33, a center surface 40, and a forward surface 41 formed from the rear part of the lens securing portion 30.

The lens securing portion 30 includes an auxiliary lens receiving groove 44 into which the auxiliary lens 3 is seated in a secure manner, as best shown in FIG. 3. The rear, inner portion of the flange edge 33 forms an engaging or cam surface 47 on the outer surface thereof.

The means for securing the auxiliary structure 1 to the primary eyeglasses 3 includes an interlocking arrangement between the primary frame receiving groove 36 and the primary frame 7, as best shown in FIG. 5. When it is desired to attach the auxiliary structure 1 to the primary eyeglasses 2, the structure 1 is advanced toward and in general alignment with the primary eyeglasses 2 so that the cam surface 47 of the auxiliary frame 4 engages the primary frame slanted front edge 15. As the auxiliary structure 1 is so advanced, the engaging relation results between the cam surface 47 and the front edge 15, biasing the flange 29 with the edge 33, over the primary frame outer surface 13. As the rearward abutting surface 39 of the flange edge 33 passes beyond the primary frame rear edge 14, the edge 33 is biased radially inwardly by the inherent resiliency of the flange 29 so that the rearward surface 39 of the flange 29 is positioned in abutting and engaging relation with the primary frame rear edge 14 thereby securely anchoring the frames together in lens aligned relationship. In this position, the center abutting surface 40 and the forward abutting surface 41 are in close or engaging relation with the primary frame outer surface 13 and the primary frame front edge 15, respectively. Removal of the auxiliary structure is accomplished by reversing the above procedure, that is, grasping the auxiliary structure and pulling it forwardly with respect to the primary frame, causing the flange rear edge 33 to be displaced radially outwardly in an auxiliary frame releasing action.

An insignificant portion of the lenses 8 is obstructed by the auxiliary frame 4, preserving nearly the complete line-of-sight of the wearer.

The flange 29 is cut away in the areas of the nose pads 24, temple mounts 22 and primary bridge 23, so as to not interfere with normal wearing of the primary eyeglasses 2. The edge 33 is absent at these aforementioned regions, allowing the nose pads 24 to rest freely on the wearer's nose and the temples 9 to freely rotate upon the temple mounts 22.

It is to be understood that while certain forms of the present invention have been illustrated and described herein, it is not to be limited to the specific forms or arrangement of parts described and shown.

What is claimed and desired to be secured by Letters Patent is as follows:

1. In combination with an eyeglass structure of the type wherein a pair of primary eyeglasses, having primary lenses and a primary frame extending about the peripheral edges of said lenses, support an auxiliary lens structure including an auxiliary frame, auxiliary lenses and a means for attaching said auxiliary structure to the primary frame, the improvement which comprises:
    (a) a flexible, rearwardly directed flange projecting along substantially the entire periphery of said auxiliary frame; said flange is pliant and biasable over the primary frame and is positioned in an engaging relationship with substantially the entire periphery of the primary frame; and said engaging relationship firmly secures said auxiliary lens structure to the primary eyeglasses.

2. In combination with an eyeglass structure of the type wherein a pair of primary eyeglasses, having primary lenses and a primary frame extending about the peripheral edges of said lenses, support an auxiliary lens structure including an auxiliary frame, auxiliary lenses and a means for attaching said auxiliary structure to the primary frame, the improvement which comprises:
    (a) a flexible, rearwardly directed member projecting along the periphery of said auxiliary frame; said member being pliant and biasable over the primary frame and positioned in an engaging relationship with the periphery of the primary frame; said member surrounding the space behind the auxiliary lens structure except in the nose receiving area; said engaging relationship firmly securing said auxiliary lens structure to the primary eyeglasses.

* * * * *